(12) United States Patent
Francis et al.

(10) Patent No.: US 7,676,652 B2
(45) Date of Patent: Mar. 9, 2010

(54) EXECUTING VARIABLE LENGTH INSTRUCTIONS STORED WITHIN A PLURALITY OF DISCRETE MEMORY ADDRESS REGIONS

(75) Inventors: Hedley James Francis, Newmarket (GB); Frederic Claude Marie Piry, Cagnes-sur-Mar (FR); Pierre Michel Broyer, Vence (FR)

(73) Assignee: ARM Limited, Cambridge (GB)

( * ) Notice: Subject to any disclaimer, the term of this patent is extended or adjusted under 35 U.S.C. 154(b) by 827 days.

(21) Appl. No.: 10/648,293

(22) Filed: Aug. 27, 2003

(65) Prior Publication Data

US 2004/0059890 A1     Mar. 25, 2004

(30) Foreign Application Priority Data

Sep. 19, 2002    (GB)    ................................. 0221772.7

(51) Int. Cl.
*G06F 9/30*    (2006.01)
*G06F 9/40*    (2006.01)
*G06F 15/00*   (2006.01)

(52) U.S. Cl. ..................................... 712/210
(58) Field of Classification Search ................. 712/213, 712/210
See application file for complete search history.

(56) References Cited

U.S. PATENT DOCUMENTS

| 3,931,615 | A | * | 1/1976 | Oliver et al. | ................ | 712/205 |
| 5,267,350 | A | * | 11/1993 | Matsubara et al. | .......... | 712/205 |
| 5,598,544 | A | * | 1/1997 | Ohshima | .................... | 712/204 |
| 5,673,410 | A | | 9/1997 | Kurisu | | |
| 5,680,564 | A | * | 10/1997 | Divivier et al. | ............. | 712/205 |

(Continued)

FOREIGN PATENT DOCUMENTS

EP    1 102 165 A1    5/2001

(Continued)

OTHER PUBLICATIONS

Translation of Japanese official action, May 23, 2006, in corresponding Japanese Application No. 2003-320631.

(Continued)

*Primary Examiner*—David J Huisman
*Assistant Examiner*—Corey S Faherty
(74) *Attorney, Agent, or Firm*—Nixon & Vanderhye P.C.

(57) ABSTRACT

Within a system supporting execution of variable length instructions a program is stored within discrete memory regions with a variable length instruction spanning a gap between two such discrete memory regions. When execution is attempted of such a variable length instruction spanning a gap, an abort handler is initiated which serves to copy the end portion of one of the memory regions together with the start portion of the other memory region into a separate fix-up memory region where these may be concatenated such that the whole of the variable length instruction will appear in one place. Execution of that variable length instruction from out of the fix-up memory region can then be triggered. This execution is constrained by the setting of a single step flag which causes the hardware to only execute the single instruction which span the gap before returning control to a single step exception handler which can then restore program flow to the point in the following memory region after the variable length instruction which spanned the gap.

62 Claims, 5 Drawing Sheets

U.S. PATENT DOCUMENTS

| | | | |
|---|---|---|---|
| 5,802,598 A * | 9/1998 | Watt | 711/170 |
| 6,237,074 B1 * | 5/2001 | Phillips et al. | 711/213 |
| 6,324,686 B1 * | 11/2001 | Komatsu et al. | 717/148 |
| 6,425,070 B1 * | 7/2002 | Zou et al. | 712/35 |
| 6,542,982 B2 * | 4/2003 | Murakami et al. | 712/207 |
| 2004/0268326 A1 * | 12/2004 | Wang et al. | 717/140 |

FOREIGN PATENT DOCUMENTS

| | | |
|---|---|---|
| JP | A-63-24327 | 2/1988 |
| JP | A-10-91435 | 4/1998 |
| JP | A-2002-116908 | 4/2002 |
| JP | A-2003-233495 | 8/2003 |
| WO | WO 02/29507 | 4/2002 |

OTHER PUBLICATIONS

Partial Abstract of JP2002116908, Colles, "Mutual Calling Between Native and Nonnative Instruction Sets".

Partial Abstract of JP10091435, Sugako et al., "Processor Executing Two Types of Instruction Length Codes and Instruction Code Input Device".

Partial Abstract of JP2003233495, Toshiyuki, "Microprocessor".

Partial Abstract of JP63024327, Takemasa, "Instruction Fetch Processing System".

* cited by examiner

EXECUTING VARIABLE LENGTH INSTRUCTIONS STORED WITHIN A PLURALITY OF DISCRETE MEMORY ADDRESS REGIONS

BACKGROUND OF THE INVENTION

1. Field of the Invention

This invention relates to the field of data processing systems. More particularly, this invention relates to data processing systems operable to execute variable length instructions stored within a plurality of memory address regions, e.g. a program fragmented within the memory.

2. Description of the Prior Art

It is known to provide data processing systems which execute variable length instructions. An example of such systems are the Jazelle enabled processors produced by ARM Limited. These processors are capable of executing programs formed of Java bytecodes that vary in their byte length. It is desirable within such systems in some circumstances to allow a program formed of variable length instructions to be stored in a plurality of different memory regions, i.e. for the program to be fragmented in memory. In a secure system such fragmentation may be desirable as a way of obfuscating the computer program concerned. In other circumstances it may be desirable in order to better use of the memory available by filling all portions of that memory even if they are discrete.

FIG. 1 of the accompanying drawings illustrates a problem which can arise in such systems. In particular, FIG. 1 illustrates a variable length program instruction which is three bytes in length and comprises a bytecode BCX followed by two operands OpdXOpdX'. This 3-byte instruction spans two discrete memory regions with the first byte being in a current memory region and the second and third bytes being in a following memory region. Standard hardware for executing such variable length instructions assumes all the bytes of a variable length instruction will be found at sequentially adjacent memory addresses. In the case illustrated in FIG. 1, the standard hardware would assume that the second and third bytes of the variable length instruction immediately followed the first byte of the variable length instruction, whereas in fact they are in a discrete memory region separated from the first byte.

The present invention recognises the problems associated with supporting variable length instructions of a program which is stored in a fragmented manner within the memory as well as providing a solution to these problems.

SUMMARY OF THE INVENTION

Viewed from one aspect the present invention provides a method of executing a sequence of variable length instructions stored within a plurality of discrete memory address regions within a memory of a data processing apparatus, said method comprising the steps of:

(i) detecting an attempt to execute a variable length instruction spanning two discrete memory address regions, said two discrete memory address regions being a current memory address region and a following memory address region;

(ii) concatenating instruction data from an end portion of said current memory address region and a start portion of said following memory address region into a fix-up memory address region of said memory to form concatenated instruction data containing said variable length instruction;

(iii) diverting program execution flow to execute said current variable length instruction from within said concatenated instruction data in said fix-up memory address region; and (iv) restoring program execution flow to execute instructions following said variable length instruction from within said following memory address region.

The invention provides the solution of concatenating the instruction data from portions of the discrete memory regions containing the variable length instruction which spans the boundary and storing this concatenated data within a fix-up memory region. The variable length instruction concerned can then be executed from its location within this fix-up region following which program flow can be returned to the normal memory region following the gap between the discrete memory regions. This provides a mechanism for dealing with fragmented program code comprising variable length instructions for which the start address of the instruction following that spanning the gap will not be known until the instruction spanning the gap has been executed whilst keeping the software overhead needed to support such a capability at a reduced level. More particularly, in preferred embodiments of the invention the step of detecting can be performed under hardware control with the steps of concatenating, diverting and restoring performed under software control, whilst the actual execution of the variable length instruction spanning the gap can be performed in hardware.

The present invention is particularly well suited for use in systems in which the variable length instructions are fetched from memory to an instruction buffer before being executed. Such an arrangement is convenient as it permits the identification of an instruction spanning discrete memory regions to be made as it is fetched from memory to the instruction buffer and the detection of the attempt to execute that instruction to be made as an attempt is made to read the variable length instruction from the instruction buffer.

More particularly, in preferred embodiments the hardware for the instruction buffer is simplified by providing that it normally operates to fetch instruction data from sequential memory addresses and identifies buffer memory locations extending beyond the endpoint of a current memory address region as containing invalid data such that if an attempt is made to execute from such buffer memory locations then appropriate corrective action may be taken.

The mechanisms for diverting and restoring program flow may be conveniently provided in preferred embodiments by manipulating a program counter value used to specify a next program instruction to be executed.

Control of the execution of variable length instructions from the fix-up memory region is conveniently provided in preferred embodiments using a single step flag which is set before program flow is diverted to the fix-up memory region and serves to allow only a single instruction to be executed from that fix-up memory region before control is returned to software for the step of restoring program flow whilst at the same time the single step flag is preferably cleared by the hardware.

Whilst it will be appreciated that the single step flag may be stored in a variety of different places, it is conveniently provided within a coprocessor register which may be accessed under program control by the software which is responsible for diverting program flow to the fix-up memory region.

A problem with variable length instructions spanning a gap between discrete memory regions is that the start point of the next instruction to be executed is not known until the instruction spanning the gap has been at least decoded and accordingly its length determined. Preferred embodiments of the invention deal with this by calculating the memory address of the following variable length instruction within the following memory region using as inputs the start address of the following memory region and the program counter value pointing to the following instruction within the fix-up memory region as determined after the current variable length instruction has been executed from within the fix-up memory region. In order to conveniently support this operation preferred embodiments serve to store the start address of the following memory region before program flow is diverted to the fix-up memory region such that this information will be available for use in calculating the entry point for use in the restoring step as program flow is restored to the correct point within the following memory region.

Whilst it will be appreciated that the present technique may be used with a variety of variable length instruction types, the technique is particularly useful when the variable length instructions are Javacard bytecode instructions to be executed as native instructions as the more abstract nature of these instructions is such that it is more likely that they may be fragmented within the memory of the physical system. In order to deal with fragmentation of Javacard bytecode programs it is desirable that the steps of concatenating, diverting and restoring are performed under software control using a further instruction set which may be executed by the data processing apparatus. Thus, whilst the data processing apparatus may support Javacard bytecodes, the physical level management of issues such as memory addressing and memory access writes and the like may be controlled at a lower operating system using software written in a different instruction set more closely related to the physical hardware concerned.

In the context of a system supporting execution of Javacard bytecodes with a further instruction set, the steps of diverting and restoring may conveniently be performed by state switching branch instructions that serve to switch execution to a Javacard mode starting from a specified memory address location which can be conveniently manipulated to control program flow.

Viewed from another aspect the present invention provides apparatus for executing a sequence of variable length instructions stored within a plurality of discrete memory address regions within a memory, said apparatus comprising:

(i) a detector operable to detect an attempt to execute a variable length instruction spanning two discrete memory address regions, said two discrete memory address regions being a current memory address region and a following memory address region;

(ii) combining logic operable to concatenate instruction data from an end portion of said current memory address region and a start portion of said following memory address region into a fix-up memory address region of said memory to form concatenated instruction data containing said variable length instruction;

(iii) diverting logic operable to divert program execution flow to execute said current variable length instruction from within said concatenated instruction data in said fix-up memory address region; and (iv) restoring logic operable to restore program execution flow to execute instructions following said variable length instruction from within said following memory address region.

Viewed from a further aspect the invention provides a computer program product for controlling a data processing apparatus operable to executing a sequence of variable length instructions stored within a plurality of discrete memory address regions within a memory of said data processing apparatus. The computer program product can include a storage medium. The computer program product comprises:

code operable after an attempt to execute a variable length instruction spanning two discrete memory address regions, said two discrete memory address regions being a current memory address region and a following memory address region, said code including:

(i) concatenating code operable to concatenate instruction data from an end portion of said current memory address region and a start portion of said following memory address region into a fix-up memory address region of said memory to form concatenated instruction data containing said variable length instruction;

(ii) diverting code operable to divert program execution flow to execute said current variable length instruction from within said concatenated instruction data in said fix-up memory address region; and (iii) restoring code operable to restore program execution flow to execute instructions following said variable length instruction from within said following memory address region.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
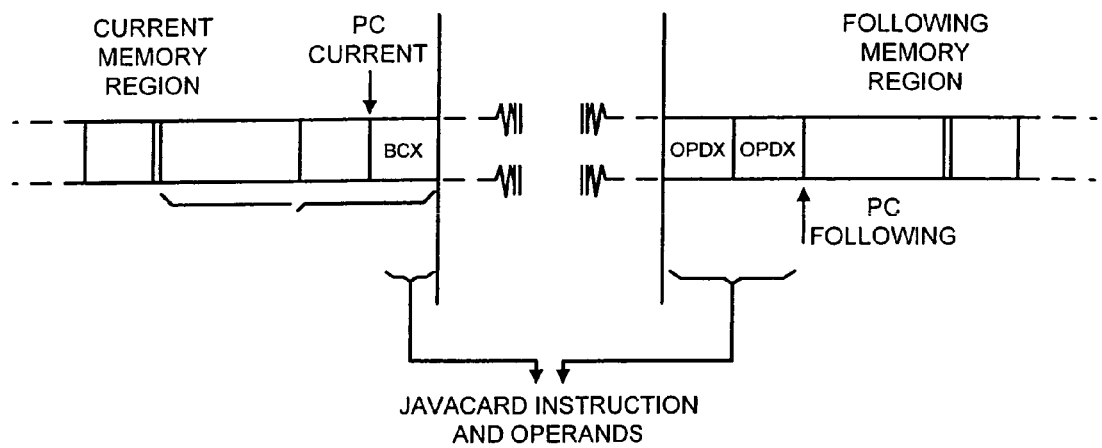
FIG. 1 schematically illustrates a variable length instruction spanning discrete memory regions.
Figure 2:
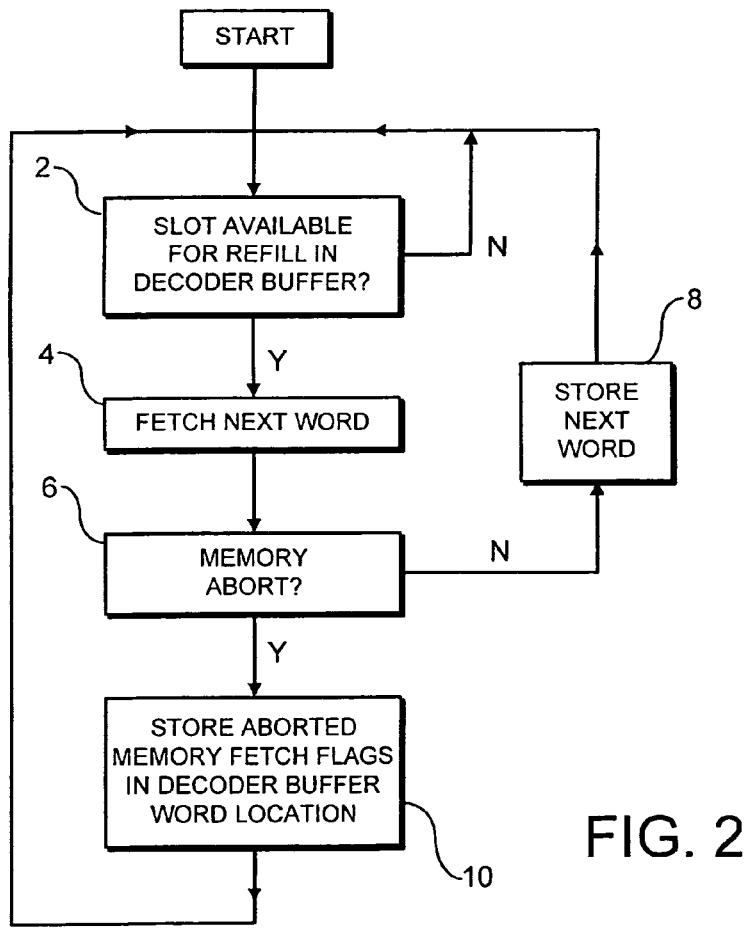
FIG. 2 is a flow diagram illustrating control of an instruction buffer used to buffer variable length instructions being fetched from a memory as instruction data before those variable length instructions are decoded.

FIG. 2 illustrates a flow diagram describing how an instruction decoder buffer may be controlled within a data processing system such as that described in PCT Published Patent Application WO-A-02/29507 (reference may be made to this published document for a description of a native Java processor). In particular, the instruction decoder buffer waits at step 2 until a slot becomes available to be refilled with instruction data fetched from the memory. When such a slot becomes available processing proceeds to step 4 at which the next 32-bit instruction data word is fetched. Since the Javacard bytecode instructions (Javacard is a special version of Java tailored for use with smartcards) contained within the instruction data word are a variable length, it will be appreciated that such a 32-bit instruction data word may contain one or more Javacard bytecode instructions or parts of Javacard bytecode instructions.

At step 6, a determination is made as to whether the fetch initiated at step 4 produced a memory abort. Such an abort may occur for a variety of reasons, but typical reasons may be a protection error or the crossing of a memory page table boundary or the like (e.g. due to fragmentation).

If a memory abort does not occur, then processing proceeds to step 8 at which the instruction data word fetched is stored within the available slot in the instruction decoder buffer and processing returned to step 2.

If a memory abort was detected at step 6, then processing proceeds to step 10 at which the slot in the instruction decoder buffer is marked with aborted memory fetch flags and then processing returned to step 2. Such aborted memory fetch flags serve the function of indicating to the Javacard bytecode decoder should it seek to access that instruction data that the instruction data is not valid since an abort occurred when the fetch attempt was made and accordingly a memory abort handler routine should be initiated. The memory abort handler is only triggered if an attempt is made to execute bytecodes which were subject to a memory abort.

Figure 3A:
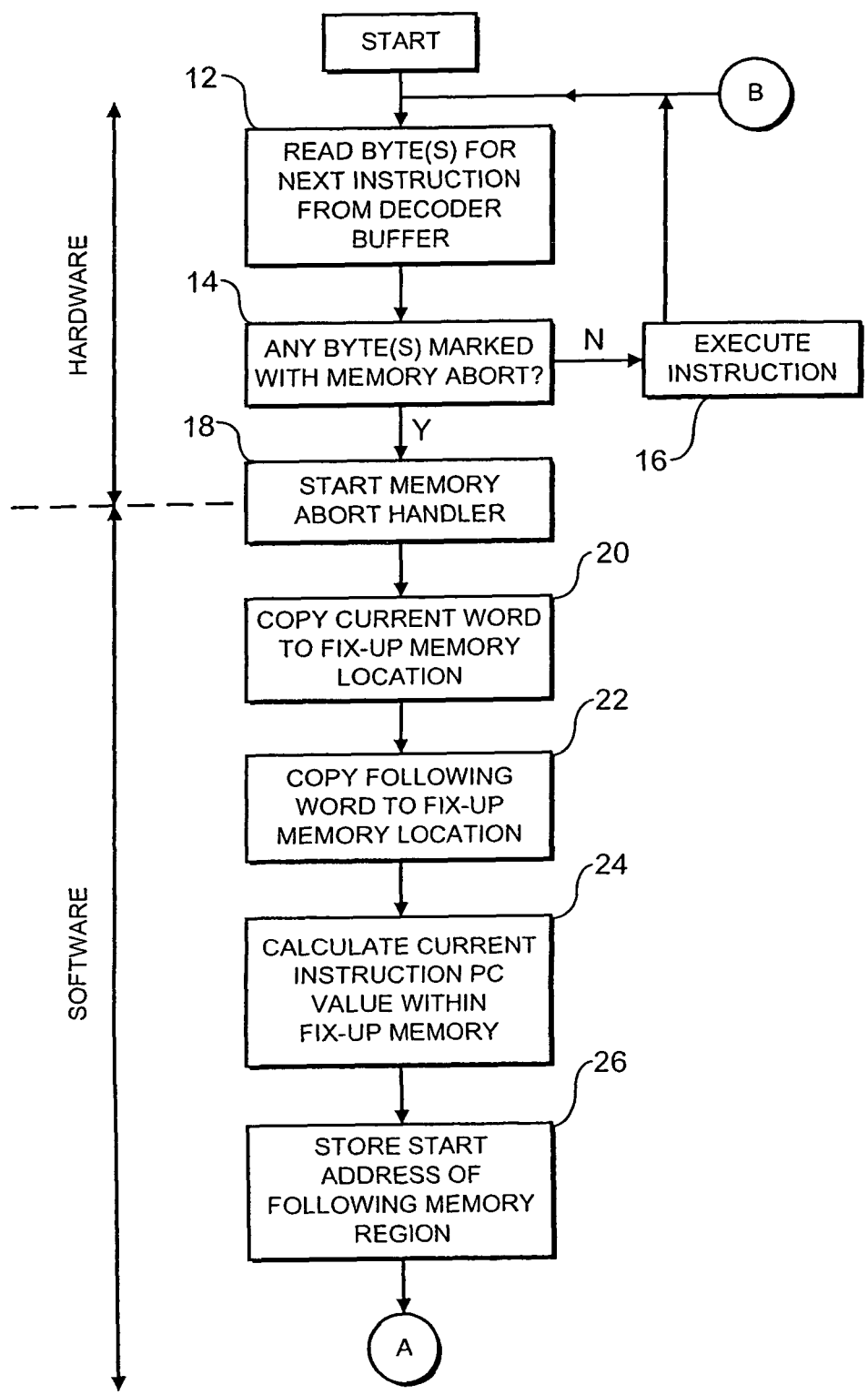
FIGS. 3A and 3B are a flow diagram illustrating how processing may be performed when a variable length instruction spanning discrete memory regions is encountered.
Figure 3B:
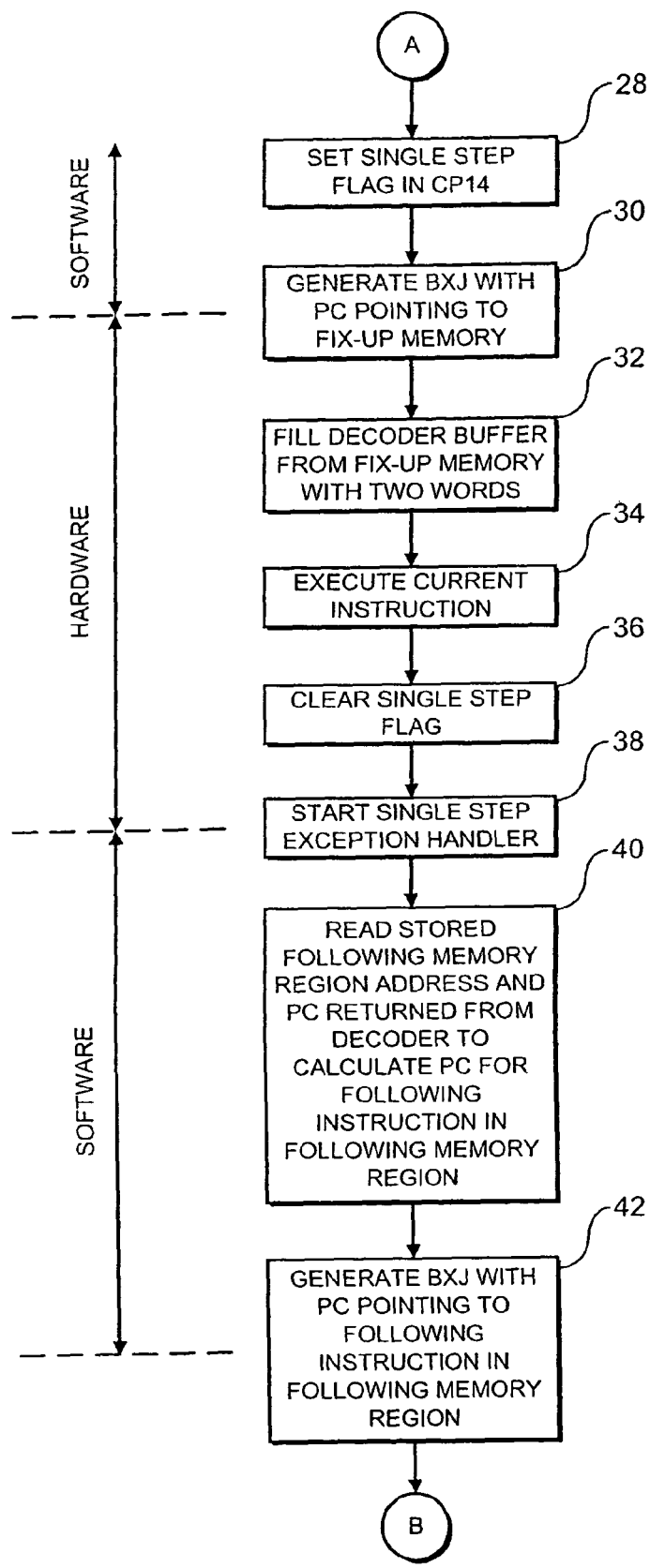

FIGS. 3A and 3B are a flow diagram illustrating processing which occurs in order to deal with variable length instructions that span a gap in the memory address space. At step 12 the Javacard decoder reads the bytes for the next instruction from the instruction decode buffer. Step 14 identifies if any of these bytes are marked with a memory abort flag. If none of the bytes are marked with a memory abort flag, then they contain valid data and processing proceeds to step 16 at which the variable length instruction specified by the bytecodes read is executed. The steps 12, 14 and 16 are performed under hardware control so as to be fast and efficient.

If the determination at step 14 was that any of the bytes being read is marked with a memory abort, then step 18 is initiated which starts a memory abort handler. This memory abort handler can deal with memory aborts of a wide variety of different types, including memory aborts due to fragmentation of the program between discrete memory regions. The rest of this flow diagram illustrates how the memory abort handler deals with such fragmentation induced aborts rather than other types of aborts. It will be appreciated that the abort handler initiated at step 18 could direct processing to other algorithms and mechanisms to deal with different types of memory aborts.

At step 20, the memory abort handler in software controls copying of the current instruction data word containing the bytecode at the start of the current variable length instruction to a fixed location within a fix-up memory region. This is followed at step 22 by copying of a immediately following instruction data word that follows in the sense of the program flow (i.e. is discrete in physical or logical memory space) into an immediately following location within the fix-up memory region. Thus, the two instruction data words are concatenated and placed next to each other within the fix-up memory.

It will be appreciated that the identification of the start of the following memory region could be made in a variety of ways, but can be determined by the memory abort handler such as by examining the memory management unit information or other information specifying, for example, a virtual address to a physical address mapping.

At step 24, the start address of the current variable length instruction which needs to be executed and which spanned the gap between the discrete memory regions is calculated within the fix-up memory region. As an example, if it was known that the current variable length instruction started at the last byte within the instruction data word at the end of the current memory region, then the program counter PC value needed within the fix-up memory region would be pointing to the last byte within the first word of the concatenated data within the fix-up memory.

At step 26, the memory abort handler serves to store in a known location the start address of the following memory region. This start address is needed later in order to determine a correct entry point into the code within the following memory region after the variable length instruction which spans the gap has been executed.

At step 28, a single step flag is set within a register of a Javacard decoder controlling coprocessor CP14. Such control registers are generally conveniently accessible under software control (e.g. coprocessor register store instructions) and can be used by programs to pass configuration information to hardware.

As a last step under the control of the memory abort handler, step 30 serves to generate a state (mode) switching branch instruction BXJ which switches execution from native ARM code in which the memory abort handler is written back to Javacard execution with a program counter value pointing to the start of the current variable length instruction within the fix-up memory. At this point, control is passed back to the hardware.

At step 32, the hardware which has been activated by the BXJ instruction with its associated PC value serves to fill the instruction decoder buffer with two instruction data words taken from the fix-up memory as this is the memory address pointed to by the PC value passed to the hardware. The PC value will also point to the position within the first of the instruction data words where the bytecode of the variable length Javacard instruction starts and execution of this Javacard variable length instruction is performed at step 34.

The Javacard decoder hardware is responsive to the single step flag set at step 28 to execute only a single Javacard instruction before clearing the single step flag at step 36 and initiating a single step exception handler at step 38.

The single step exception handler passes control again back to software, such as an ARM instruction routine. The single step exception handler serves to restore program flow back to its proper position within the following memory region after the execution of the single instruction from within the fix-up memory region.

At step 40, the single step exception handler serves to read the following memory region address which was stored at step 26 and the program counter PC value which was returned after the hardware had executed the instruction which spanned the gap between discrete memory regions at step 34. It will be appreciated that the hardware updates the PC value itself once it has executed an instruction and accordingly this hardware can effectively be used to indicate the length of the instruction which spanned the gap between the discrete memory regions such that the offset from the start of the following memory region at which the following variable length instruction starts may be determined. More particularly, in some embodiments the least significant bits of the PC value can be used to indicate the offset from the start of the following memory region at which the following variable length instruction will be found.

At step 42, the single step exception handler generates a BXJ instruction switching back to the Javacard execution state with a PC value pointing to the following instruction in the following memory region as was determined at step 40. Processing then returns to step 12.

Figure 4:
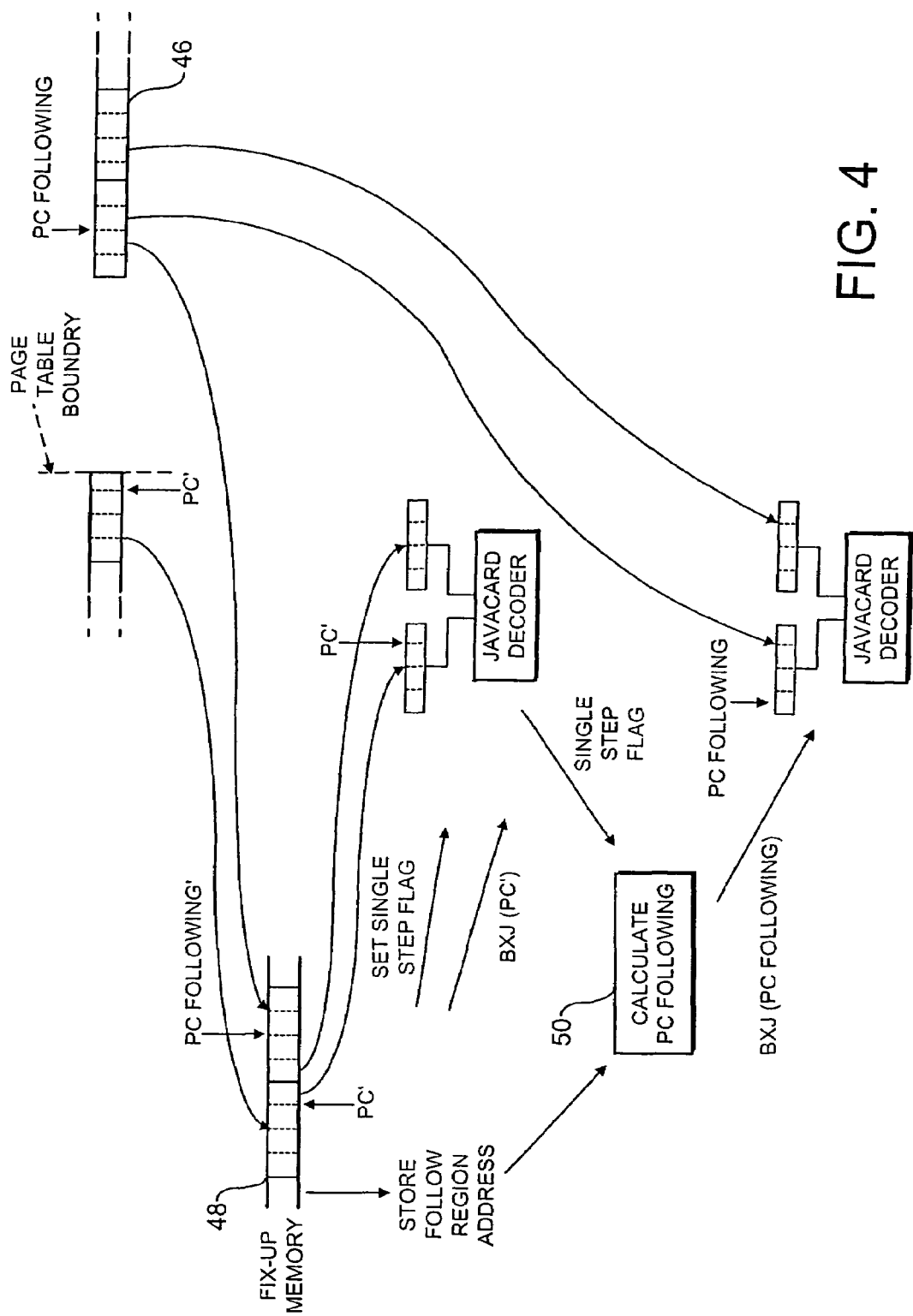
FIG. 4 is a diagram illustrating the operations described in relation to FIGS. 3A and 3B in a different way.

FIG. 4 schematically illustrates the processing described in relation to FIGS. 3A and 3B.

A current memory region 44 and a discrete following memory region 46 are illustrated. The current memory region 44 terminates with a page table boundary and an attempt to read instruction data from beyond this page table boundary will cause a memory abort. As illustrated, the PC value of the last variable length instruction reached within the current memory region 44 is shown and this current variable length instruction is in fact three bytes in length and accordingly the first two bytes of the following memory region 46 form part of the current variable length instruction.

As illustrated, the end portion of the current memory region 44 constituting the last 32-bit instruction data word of that region, together with the beginning portion of the following memory region 46 constituting the first 32-bit instruction word of that region are both copied under control of the memory abort handler to a fix-up memory region 48 where they are concatenated. The program counter PC from within the current memory region 44 is converted to a program counter PC' within the fix-up memory region 48. A BXJ mode switching branch instruction is then initiated to switch to the Javacard mode and activate the Javacard decoder. The PC' value is passed to the Javacard decoder as an R14 value stored within the normal position for such a BXJ instruction within the general purpose bank of ARM registers as normally addressed in ARM mode.

When the Javacard decoder has been activated it serves to copy the two now concatenated instruction data words from the fix-up memory 48 into the instruction decoder buffer. Execution of the Javacard instruction starting at the program counter value position PC' is then performed and will utilise bytes from both slots within the instruction decoder buffer. Before control was passed to the Javacard decoder by the BXJ instruction, the memory abort handler set a single step flag for the Java decoder which constrains the Java decoder to execute only a single instruction before initiating a single step exception handler software routine. Thus, after the single instruction which spanned the current memory region 44 and following memory region 46 processing passes to the single step exception handler 50. The single step exception handler 50 uses a stored value of the following region start address that was stored in a predetermined position by the memory abort handler together with the program counter value PCfollowing' that was calculated by the Javacard decoder after execution of its single instruction to together calculate the true PCfollowing value within the following memory region 46. When this has been calculated, another BXJ instruction is generated using the PCfollowing value within the following memory region 46 as a variable to be passed back to the Javacard decoder such that execution of the instructions within the following memory region 46 can commence starting with the first full variable length instruction within that following memory region 46. Thus, the two first instruction data words from the following memory region 46 are copied into the instruction decoder buffer and Javacard execution restarted.

Figure 5:
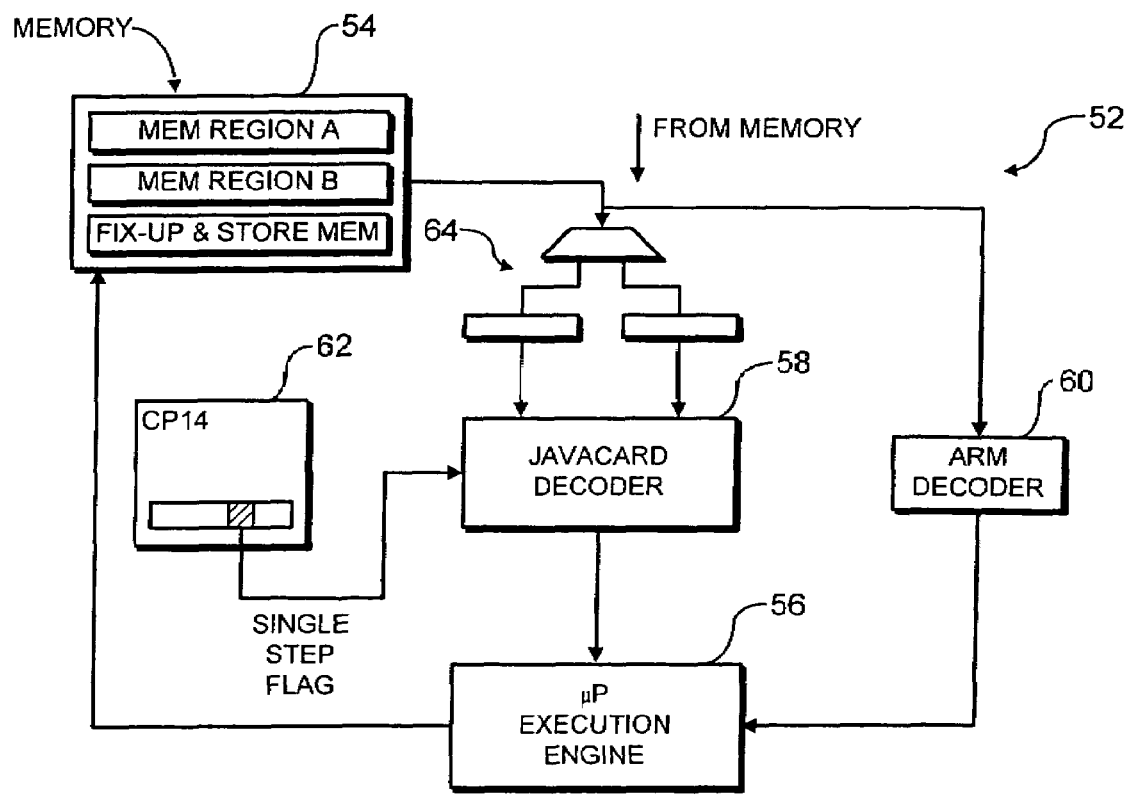
FIG. 5 is a schematic hardware diagram illustrating a system in which the techniques described in relation to FIGS. 2 to 4 may be used.

FIG. 5 schematically illustrates hardware that may execute the above described techniques. It will be appreciated that FIG. 5 is highly simplified and omits for the sake of clarity various circuit elements which are not involved in the present techniques. The system 52 includes a memory 54, a microprocessor execution engine 56, a Javacard decoder 58, an ARM instruction decoder 60, a coprocessor 62 and an instruction decoder buffer 64. The execution of Javacard bytecodes can be performed in the way described in the previously mentioned PCT Published Patent Application WO-A-02/29507. In particular, Javacard bytecodes read from the memory 54 are fed via the instruction decoder buffer 64 to the Javacard decoder 58 where they are used to generate control signals that control the microprocessor execution engine 56 to perform the desired processing. In the ARM mode, the ARM decoder 60 receives ARM instructions from the memory 54 and produces its own control signals to control the microprocessor execution engine 56.

As illustrated, the memory 54 contains various discrete memory regions A and B which store different portions of a Javacard program with variable length instructions being permitted to span the gaps between the memory regions. Also within the memory 54 is a fix-up memory region where concatenation of an end portion and a start portion of discrete memory regions can be made so as to reconstruct the full versions of a variable length instructions which span that gap so that the instruction may be executed out of the fix-up memory region. Storage for information such as the start address of the following memory region is also provided within the memory 54 for use by the previously described single step exception handler in order to restore processing back to the correct point within the following memory region. Also stored within the memory 54, but not illustrated, will be memory abort handling code and other support code needed by the system 52. This memory abort handling code, support code and the single step exception handler will typically be provided in the form of ARM code to be decoded by the ARM decoder 60.

As illustrated, a coprocessor 62 is coupled to the Javacard decoder 58 and stores various configuration parameters associated with the Javacard decoder 58. Many of these parameters are associated with the initialisation of the Java Virtual Machine upon which the Javacard bytecodes are considered to be executing. As illustrated, one of the registers within the coprocessor 62 contains a flag which serves as a single step flag which when set constrains the Javacard decoder to execute only a single Javacard instruction before triggering the single step exception handler and clearing the single step flag.

The use of this single step flag in connection with the above technique for dealing with memory fragmentation has been discussed, but the single step flag may also be used as a debugging aid even when the Javacard instructions do not span memory regions. Thus, Javacard instructions can be executed one at a time with control then being passed to suitable code serving as the single step exception handler but in fact relating to debug.

It will be appreciated that the above described techniques have been presented in the form of a method for executing an instruction and an apparatus for executing instructions. However, it will be appreciated that a significant portion of the invention is implemented in the form of computer code serving as the memory abort handler and the single step exception hander. This special purpose code may be separately supplied as a commercial item in its own right and can be considered as an embodiment of the invention.

It will be appreciated that the above described embodiments have been directed towards a system which implements the present technique in a mixture of hardware and software. In particular, software is provided in the form of the memory abort handler and the single step exception handler and hardware support for the technique is provided in the form of the single step flag and the responsiveness of the Javacard decoder to the single step flag. It will however be appreciated that other embodiments of the invention may be purely implemented in the form of software.

As an example, detection of a memory abort could be made in the same way and then a memory abort handler triggered which fully dealt with the fragmentation of variable length instructions within software. The first portion of such a software program would provide the functionality of the memory abort handler described above in identifying the memory abort as relating to a variable length instruction being fragmented, and then copying the different portions of that variable length instruction into a fix-up memory region to form a concatenated set of instruction data words containing the entire variable length instruction. In this software implementation, instead of then passing control back to the hardware to execute a single instruction being the variable length instruction, the software could instead emulate this instruction. As part of this emulation a look up table which would specify the length of the variable length instruction depending upon the first byte would be used. This length would be known to the software and accordingly could then be used to calculate the start address within the following memory region of the following variable length instruction. The software could then restore program flow to that following memory region starting at the calculated memory address.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of executing a sequence of variable length instructions stored prior to any fetching as part of decoding and execution within a plurality of discrete memory address regions within a memory of a data processing apparatus, said plurality of discrete memory address regions including a current memory address region and a following memory address region, said current memory address region and said following memory address region being non-contiguous with a gap therebetween, said method comprising the steps of:

(i) detecting an attempt to execute a variable length instruction spanning two discrete memory address regions, said two discrete memory address regions being said current memory address region and said following memory address region and said attempt triggering a memory abort, said detecting together with said triggering causing further steps (ii)-(iv) to be performed;

(ii) copying instruction data from an end portion of said current memory address region and a start portion of said following memory address region into a fix-up memory address region of said memory to form concatenated instruction data containing said variable length instruction, said fix-up memory address region being separate from said current memory address region and said following memory address region within said memory;

(iii) diverting program execution flow to execute said current variable length instruction from within said concatenated instruction data in said fix-up memory address region; and (iv) restoring program execution flow to execute instructions following said variable length instruction from within said following memory address region.

2. A method as claimed in claim 1, wherein said step of detecting is performed under hardware control.

3. A method as claimed in claim 1, wherein said steps of concatenating, diverting and restoring are performed under software control.

4. A method as claimed in claim 1, wherein variable length instructions are fetched from said memory to an instruction buffer before being executed.

5. A method as claimed in claim 4, wherein said step of detecting occurs as said variable length instruction is read from said instruction buffer.

6. A method as claimed in claim 4, wherein fetching of variable length instructions to said instruction buffer is performed by fetching instruction data from sequential memory addresses under hardware control.

7. A method as claimed in claim 6, wherein when a fetch is attempted from a memory address beyond an end point of said current memory address region to a buffer memory location, said buffer memory location is marked as not containing valid instruction data.

8. A method as claimed in claim 7, wherein said step of detecting comprises detecting an attempt to execute an instruction at least partially stored in a buffer memory location marked as not containing valid instruction data.

9. A method as claimed in claim 1, wherein a program counter value specifies a location of a variable length instruction to be executed.

10. A method as claimed in claim 9, wherein said steps of diverting and restoring act by modifying said program counter value.

11. A method as claimed in claim 1, comprising setting a single step flag, said single step flag serving to limit hardware execution of variable length instructions to a single variable length instruction.

12. A method as claimed in claim 11, wherein said single step flag serves to limit hardware execution of variable length instructions to a single variable length instruction from said concatenated instruction data to a single variable length instruction before control is returned to software to perform said step of restoring.

13. A method as claimed in claim 11, wherein upon hardware execution of said single variable length instruction, said single step flag is cleared under hardware control.

14. A method as claimed in claim 11, wherein said single step flag is stored within a coprocessor register.

15. A method as claimed in claim 1, comprising calculating a start address within said following region of memory of a following variable length instruction following said current variable length instruction.

16. A method as claimed in claim 15, wherein said step of calculating uses as inputs a start address of said following memory region and a program counter value pointing to said following variable length instruction within said fix-up memory region following execution of said current variable length instruction.

17. A method as claimed in claim 16, comprising storing said start address of said following memory region before said step of diverting.

18. A method as claimed in claim 1, wherein said variable length instructions are Javacard bytecode instructions executed as native instructions by said data processing apparatus.

19. A method as claimed in claim 18, wherein said data processing apparatus also supports execution of instructions of a further instruction set, said steps of concatenating, diverting and restoring being performed under control of instructions of said further instruction set.

20. A method as claimed in claim 19, wherein said steps of diverting and restoring are performed using state switching branch instructions that serve to switch to execution of Java bytecodes starting from a specified memory address location.

21. A method as claimed in claim 1, wherein a program to be executed is stored within fragmented memory regions within said memory.

22. A hardware apparatus for executing a sequence of variable length instructions stored prior to any fetching as part of decoding and execution within a plurality of discrete memory address regions within a memory, said plurality of discrete memory address regions including a current memory address region and a following memory address region, said current memory address region and said following memory address region being non-contiguous with a gap therebetween, said apparatus comprising:

(i) a detector configured to detect an attempt to execute a variable length instruction spanning two discrete memory address regions, said two discrete memory address regions being said current memory address region and said following memory address region and said attempt triggering a memory abort;

(ii) combining logic circuitry configured, when said detector detects said attempt and said memory abort, to copy instruction data from an end portion of said current memory address region and a start portion of said following memory address region into a fix-up memory address region of said memory to form concatenated instruction data containing said variable length instruction, said fix-up memory address region being separate from said current memory address region and said following memory address region within said memory;

(iii) diverting logic circuitry configured to divert program execution flow to execute said current variable length instruction from within said concatenated instruction data in said fix-up memory address region; and (iv) restoring logic circuitry configured to restore program execution flow to execute instructions following said variable length instruction from within said following memory address region.

23. Apparatus as claimed in claim 22, wherein said detector is non-programmable hardware.

24. Apparatus as claimed in claim 22, wherein said concatenating logic, said diverting logic circuitry and said restoring logic circuitry comprise programmable hardware operating under software control.

25. Apparatus as claimed in claim 22, wherein variable length instructions are fetched from said memory to an instruction buffer before being executed.

26. Apparatus as claimed in claim 25, wherein said detector acts as said variable length instruction is read from said instruction buffer.

27. Apparatus as claimed in claims 25, wherein fetching of variable length instructions to said instruction buffer is performed by fetching instruction data from sequential memory addresses under hardware control.

28. Apparatus as claimed in claim 27, wherein when a fetch is attempted from a memory address beyond an end point of said current memory address region to a buffer memory location, said buffer memory location is marked as not containing valid instruction data.

29. Apparatus as claimed in claim 28, wherein said detector is configured to detect an attempt to execute an instruction at least partially stored in a buffer memory location marked as not containing valid instruction data.

30. Apparatus as claimed in claim 22, wherein a program counter value specifies a location of a variable length instruction to be executed.

31. Apparatus as claimed in claim 30, wherein said diverting logic circuitry and said restoring logic circuitry are configured to act by modifying said program counter value.

32. Apparatus as claimed in claim 22, comprising means for setting a single step flag, said single step flag serving to limit hardware execution of variable length instructions to a single variable length instruction.

33. Apparatus as claimed in claim 32, wherein said single step flag serves to limit hardware execution of variable length instructions to a single variable length instruction from said concatenated instruction data to a single variable length instruction before control is returned to software to perform said restoring.

34. Apparatus as claimed in claim 32, wherein upon hardware execution of said single variable length instruction, said single step flag is cleared under hardware control.

35. Apparatus as claimed in claim 32, wherein said single step flag is stored within a coprocessor register.

36. Apparatus as claimed in claim 22, comprising calculating logic configured to calculate a start address within said following region of memory of a following variable length instruction following said current variable length instruction.

37. Apparatus as claimed in claim 36, wherein said calculating logic circuitry is configured to use as inputs a start address of said following memory region and a program counter value pointing to said following variable length instruction within said fix-up memory region following execution of said current variable length instruction.

38. Apparatus as claimed in claim 37, comprising means for storing said start address of said following memory region before said diversion.

39. Apparatus as claimed in claim 22, wherein said variable length instructions are Java bytecode instructions executed as native instructions by said apparatus.

40. Apparatus as claimed in claim 39, wherein said apparatus also supports execution of instructions of a further instruction set, and wherein said concatenating logic circuitry, said diverting logic circuitry, and said restoring logic circuitry are under control of instructions of said further instruction set.

41. Apparatus as claimed in claim 40, wherein said diverting logic circuitry and said restoring logic circuitry are configured to use mode switching branch instructions that serve to switch to execution of Java bytecodes starting from a specified memory address location.

42. Apparatus as claimed in claim 22, wherein a program to be executed is stored within fragmented memory regions within said memory.

43. A computer program product including a storage medium encoded with instruction code readable by a data processing apparatus, which when executed by the data processing apparatus, controls the data processing apparatus to execute a sequence of variable length instructions stored prior to any fetching as part of decoding and execution within a plurality of discrete memory address regions within a memory of said data processing apparatus, said plurality of discrete memory address regions including a current memory address region and a following memory address region, said current memory address region and said following memory address region being non-contiguous with a gap therebetween, said instruction code comprising:

code configured after an attempt to execute a variable length instruction spanning two discrete memory address regions, said two discrete memory address regions being said current memory address region and said following memory address region and said attempt triggering a memory abort, said code including:

(i) concatenating code encoded in the storage medium which, when executed by the data processing apparatus in response to said attempt and said memory abort, controls the data processing apparatus to copy instruction data from an end portion of said current memory address region and a start portion of said following memory address region into a fix-up memory address region of said memory to form concatenated instruction data containing said variable length instruction, said fix-up memory address region being separate from said current memory address region and said following memory address region within said memory;

(ii) diverting code encoded in the storage medium which, when executed by the data processing apparatus, controls the data processing apparatus to divert program execution flow to execute said current variable length instruction from within said concatenated instruction data in said fix-up memory address region; and (iii) restoring code encoded in the storage medium which, when executed by the data processing apparatus, controls the data processing apparatus to restore program execution flow to execute instructions following said variable length instruction from within said following memory address region.

44. A computer program product as claimed in claim 43, wherein detection of said attempt to execute a variable length instruction spanning two discrete memory address regions is performable under hardware control.

45. A computer program product as claimed in claim 43, wherein when the code is executed by the data processing apparatus, the data processing apparatus fetches variable length instructions from said memory to an instruction buffer before being executed.

46. A computer program product as claimed in claim 45, wherein when the code is executed by the data processing apparatus, said detection occurs as said variable length instruction is read from said instruction buffer.

47. A computer program product as claimed in claim 45, wherein when the code is executed by the data processing apparatus, the data processing apparatus fetches variable length instructions to said instruction buffer by fetching instruction data from sequential memory addresses under hardware control.

48. A computer program product as claimed in claim 47, wherein when the code is executed by the data processing apparatus and a fetch is attempted from a memory address beyond an end point of said current memory address region to a buffer memory location, the data processing apparatus marks said buffer memory location as not containing valid instruction data.

49. A computer program product as claimed in claim 48, wherein said detection comprises detecting an attempt to execute an instruction at least partially stored in a buffer memory location marked as not containing valid instruction data.

50. A computer program product as claimed in claim 43, wherein when the code is executed by the data processing apparatus, a program counter value specifies a location of a variable length instruction to be executed.

51. A computer program product as claimed in claim 50, wherein when the code is executed by the data processing apparatus, said diverting code and said restoring code act by modifying said program counter value.

52. A computer program product as claimed in claim 43, comprising setting code configured, when executed by the data processing apparatus, to set a single step flag, said single step flag serving to limit hardware execution of variable length instructions to a single variable length instruction.

53. A computer program product as claimed in claim 52, wherein said single step flag serves to limit hardware execution of variable length instructions to a single variable length instruction from said concatenated instruction data to a single variable length instruction before control is returned to software to perform said restoring.

54. A computer program product as claimed in claim 52, wherein upon hardware execution of said single variable length instruction, and the code is executed by the data processing apparatus, said single step flag is cleared under hardware control.

55. A computer program product as claimed in claim 52, wherein when the code is executed by the data processing apparatus, said single step flag is stored within a coprocessor register.

56. A computer program product as claimed in claim 43, comprising calculating code encoded in the storage medium which, when executed by the data processing apparatus, controls the data processing apparatus to calculate a start address within said following region of memory of a following variable length instruction following said current variable length instruction, 57. A computer program product as claimed in claim 56, wherein said calculating code which, when executed by the data processing apparatus, controls the data processing apparatus to use as inputs a start address of said following memory region and a program counter value pointing to said following variable length instruction within said fix-up memory region following execution of said current variable length instruction.

58. A computer program product as claimed in claim 57, wherein when the code is executed by the data processing apparatus, said start address of said following memory region is stored before said diversion.

59. A computer program product as claimed in claim 43, wherein said variable length instructions are Java bytecode instructions executed as native instructions by said data processing apparatus.

60. A computer program product as claimed in claim 59, wherein said data processing apparatus also supports execution of instructions of a further instruction set, and when the code is executed by the data processing apparatus, said concatenating, diverting and restoring are performed under control of instructions of said further instruction set.

61. A computer program product as claimed in claim 60, wherein said diverting code and said restoring code are configured to control the data processing apparatus to use state switching branch instructions that serve to switch to execution of Java bytecodes starting from a specified memory address location.

62. A computer program product as claimed in claim 43, wherein when the code is executed by the data processing apparatus, a program to be executed is stored within fragmented memory regions within said memory.

* * * * *